Dec. 6, 1927.
R. A. MIDGLEY
CAM SHAFT
Filed March 29, 1926
1,651,402
2 Sheets-Sheet 1
Fig. 1.
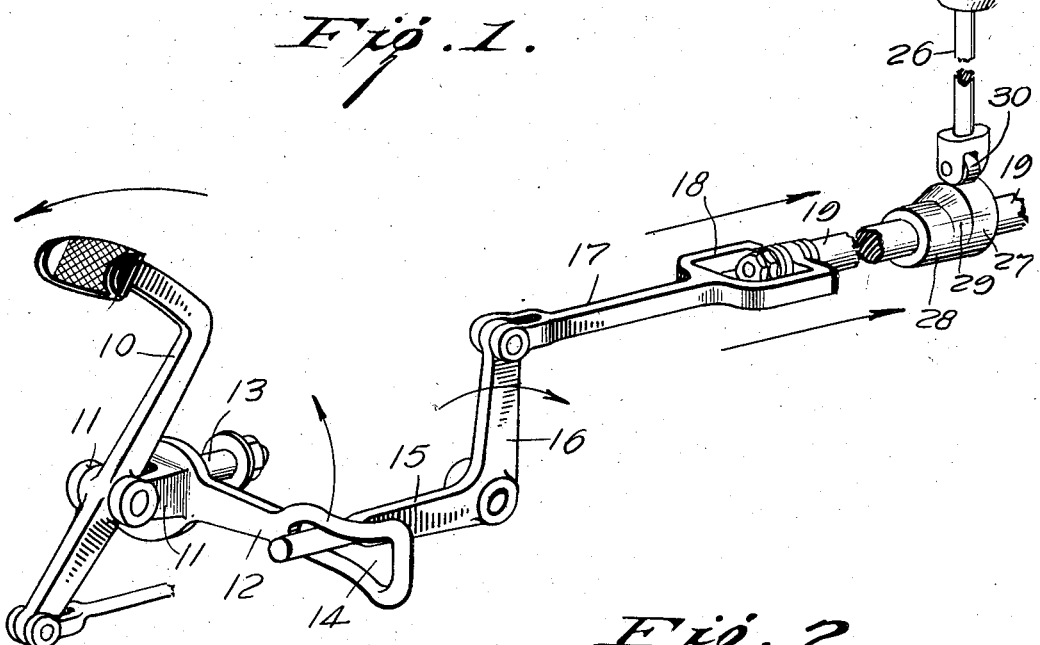
Fig. 2.
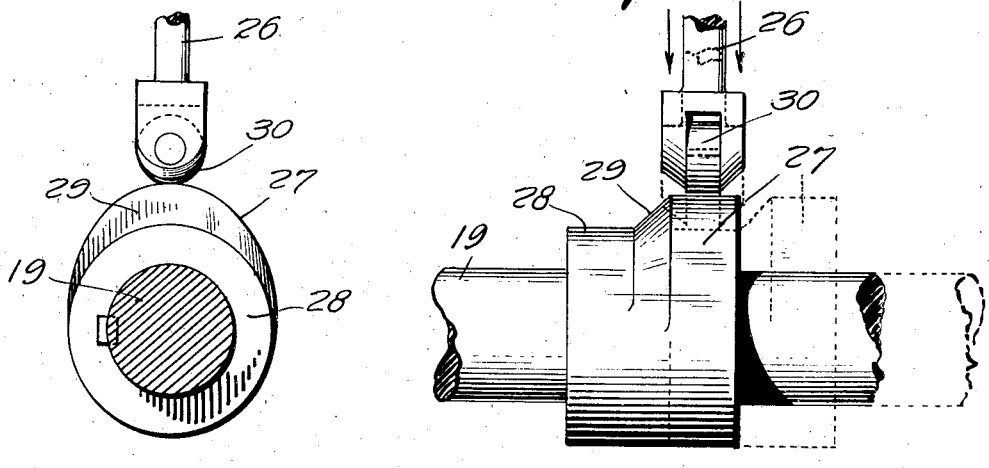
Fig. 3.
Inventor
ROY A. MIDGLEY,
By Townshend & Townshend,
Attorneys Dec. 6, 1927.
R. A. MIDGLEY
1,651,402
CAM SHAFT
Filed March 29, 1926
2 Sheets-Sheet 2
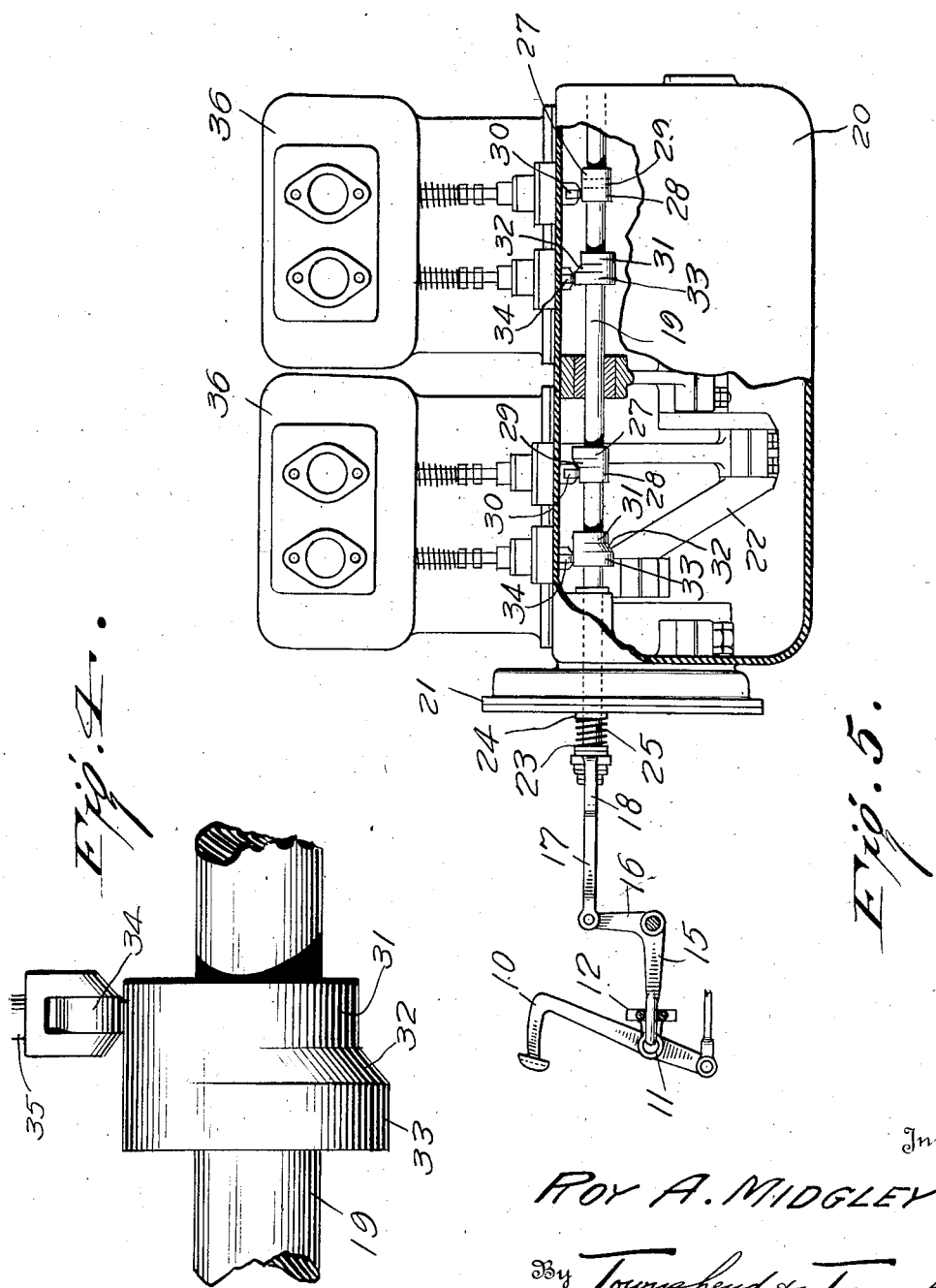

Patented Dec. 6, 1927.

1,651,402

UNITED STATES PATENT OFFICE.

ROY A. MIDGLEY, OF MOUNT DORA, FLORIDA.

CAM SHAFT.

Application filed March 29, 1926. Serial No. 98,370.

My invention relates to control mechanism for automobile engines of the internal combustion type, having tappet valves operated from a cam shaft. The primary object of the invention is the provision, in an engine of this character, of a manually controlled cam shaft shifting mechanism whereby the operation of the engine valves is affected.

Another object of the invention is the provision of means for changing the valve action of an automobile engine whereby the intake valves are held continuously closed and the exhaust valves are held continuously open during continued rotation of the engine crank shaft.

A further object of the invention is the provision of a novel accelerator pedal control for shifting an engine cam shaft to accomplish the objects stated above.

A still further object is the provision in a cam operated, tappet valve type internal combustion engine, of a novel cam construction and means for shifting position thereof.

With these objects in view and such others as will be apparent from the description, the invention resides in the novel construction, combination and arrangement of parts hereinafter described and claimed, and illustrated in the accompanying drawings which show one practical embodiment of the invention.

Figure 1 is a perspective of the operating connection between the foot pedal accelerator of an automobile and the longitudinally shiftable cam shaft of the engine, as constructed in accordance with the principles of the invention;

Figure 2 is a fragmentary elevation of the cam shaft with the intake valve cam disposed thereon and illustrating in dotted lines the shift position of the cam and shaft;

Figure 3 is an end elevation of the assembly shown in Figure 2;

Figure 4 is an elevation of a portion of the cam shaft with the exhaust valve cam mounted thereon;

Figure 5 is a side elevation, partly broken away, illustrating the invention as assembled in relation to the engine.

As shown in Figure 1, the foot pedal constituting the accelerator 10 of an automobile is pivoted intermediate its ends between spaced ears 11 which are integral with and extend laterally from one face of an arm 12, which arm is provided on its opposite face with an integral laterally extending shaft 13 whereby it may be mounted for pivotal movement in a supporting member (not shown) carried by the automobile. One end of the arm 12 is formed with an elongated slot 14 through which extends one end of the long arm 15 of a bell crank lever suitably mounted upon some supporting member of the automobile body (not shown). The short arm 16 of the bell crank lever is pivotally connected to a rod 17 having at its end a yoke 18 in swiveled connection with one end of a longitudinally shiftable cam shaft 19 which extends within the engine crank case 20 in the usual manner of such cam shaft constructions. Between the gear casing 21 containing the connecting gearing between the engine crank shaft 22 and the cam shaft 19, a pair of washers 23 and 24 are disposed over the projecting portion of the cam shaft for bearing respectively against the yoke 18 and the gear casing 21. Surrounding the shaft between these two washers is a coil expansion spring 25; the purpose of which is to maintain the cam shaft in projected position which is the normal position of the cam shaft in the operation of the engine.

By reason of the mounting of the arm 12 which carries the accelerator pedal, when the pedal is moved to one side the arm 12 will be raised in the direction of the arrow carrying up the long arm 15 of the bell crank lever thereby causing the cam shaft 19 to be shifted longitudinally within the engine crank case, against compression of the spring 25. As soon as pressure is relieved on the accelerator pedal, spring 25 returns the cam shaft to its normal position for the regular alternate timed operation of the engine valves. The accelerator 10 in its normal fuel control operation, rocks in a vertical plane on its pivots between the ears 11, and is moved sidewise, in a plane at an angle to that of its normal movement, to effect shifting of the cam shaft.

As best shown in Figures 2 and 3 the valve rod 26 of the intake valve is operated in the normal position of the cam shaft 19 as shown in full lines, by the usual eccentric cam 27 which is secured to the cam shaft in the usual manner. One improvement of the present invention consists in providing a cam extension 28 at one side of the cam 27 concentric with the shaft 19. The cam 28 is smaller than the rise of the cam 27, and a gradually inclined intermediate cam surface 29 connects both the eccentric and concentric cam portions. In the preferred embodiment of the invention the cam in its entirety constitutes an integral unit. It is apparent that when the cam shaft 19 is shifted longitudinally into the dotted line position as shown in Figure 2, that the roller 30 of the valve rod 26 will be engaged with the concentric cam 28, which being smaller than the rise of the cam 27 maintains the intake valve in closed position during continued operation of the cam shaft.

The cam control for the exhaust valve assembly is shown in Figure 4 wherein the cam shaft 19 has secured thereto the usual eccentric cam 31 which is joined by means of a gradually inclined intermediate cam section 32 with a cam section 33, which is concentric with the cam shaft. In this instance the radius of the concentric cam 33 corresponds with the radius extending from the axis of the cam shaft to the furthest point on the periphery of the eccentric cam 31 and it is apparent that when the shaft 19 is shifted the roller 34 of the exhaust valve rod 35 will be engaged over the concentric cam 33 and the exhaust valve will be held continuously in open position during continued operation of the cam shaft.

The operation of the invention is best understood from an inspection of Figure 5 wherein the relation of elements is set forth. In the normal position of the cam shaft 19 the intake and exhaust valves of the various engine cylinders 36 operate in alternate timed relation through the medium of the eccentric cams 27 and 31. When the operator of the automobile desires to coast without disengaging the clutch, shifting the gears, or disturbing the accelerator adjustment a slight movement of the foot upon the accelerator pedal 10 is sufficient to shift the cam shaft longitudinally thereby bringing the concentric cams 28 and 33 into position beneath the valve rods. In this position of the cam shaft the intake valves will be held closed while the exhaust valves will be held open allowing a free operation of the engine without any waste of fuel. When it is desired to employ the braking force of the engine or to renew the power thereof, pressure of the operator's foot is removed from the accelerator pedal and the action of the spring 25 immediately restores the cams to the normal operating position.

While in this embodiment of the invention I have illustrated and described certain details entering into the construction and operation thereof, I desire it to be understood that the invention is not to be limited thereby, but that any desired changes and modifications may be made in the structural details as will fall within the scope of the invention as claimed.

I claim:

1. In an engine provided with cam operated intake and exhaust valves normally operated in timed relation, a shiftable cam shaft, cams on said shaft arranged for holding one set of valves continuously open and at the same time permitting the other set of valves to be continuously closed while the engine is turning over, on shifting of said shaft, and means for shifting said shaft.

2. In an engine provided with intake and exhaust valves normally operated alternately in timed relation from a cam shaft geared to the engine crank shaft, a foot pedal, operative connection between said pedal and cam shaft, and means on said cam shaft for simultaneously changing the valve operation from alternate to simultaneous, during rotation of the engine crank shaft, on movement of said foot pedal.

3. In an automobile, the combination with a foot pedal pivoted for movement to control the fuel supply mechanism of the automobile engine and mounted for movement in other directions, of an operating connection between said pedal and the cam shaft of the engine whereby said cam shaft may be shifted longitudinally upon movement of said pedal, in a direction at an angle to its normal fuel supply control movement.

4. The combination with an automobile engine having an accelerator control normally movable in a fixed plane and mounted to be moved in a plane at an angle thereto, of a longitudinally shiftable cam shaft having a plurality of cam elements thereon, a member movable to shift said cam shaft, and connection between said accelerator control and movable member for moving said member on movement of said accelerator control in a plane at an angle to its plane of normal movement.

In testimony whereof I have affixed my signature.

ROY A. MIDGLEY.